(12) United States Patent
Lyle et al.

(10) Patent No.: US 8,380,766 B2
(45) Date of Patent: Feb. 19, 2013

(54) SYSTEMS AND METHODS FOR HANDLING ADDRESSES WITHIN A DATABASE APPLICATION

(75) Inventors: James G. Lyle, Overland Park, KS (US); James D. Hedrick, Kansas City, MO (US)

(73) Assignee: Adaptive Intelligence LLC, Kansas City, MO (US)

(*) Notice: Subject to any disclaimer, the term of this patent is extended or adjusted under 35 U.S.C. 154(b) by 852 days.

(21) Appl. No.: 12/368,186

(22) Filed: Feb. 9, 2009

(65) Prior Publication Data
US 2009/0204783 A1 Aug. 13, 2009

Related U.S. Application Data

(60) Provisional application No. 61/027,258, filed on Feb. 8, 2008.

(51) Int. Cl.
G06Q 10/00 (2006.01)
(52) U.S. Cl. .................... 707/999.001; 705/1.1
(58) Field of Classification Search ............ 705/330, 705/401–411, 1.1; 707/999.001–999.007, 707/E17.108; 382/101, 100; 700/226, 223, 700/224; 209/584; 711/202–209, E12.002
See application file for complete search history.

(56) References Cited

U.S. PATENT DOCUMENTS

| | | | |
|---|---|---|---|
| 6,363,388 B1* | 3/2002 | Sprenger et al. | 1/1 |
| 6,385,504 B1* | 5/2002 | Pintsov et al. | 700/226 |
| 8,224,830 B2* | 7/2012 | Bidlack | 707/758 |
| 2002/0019921 A1* | 2/2002 | Hagersten et al. | 711/205 |
| 2002/0168090 A1* | 11/2002 | Bruce et al. | 382/101 |
| 2003/0182017 A1* | 9/2003 | O'Donohue et al. | 700/224 |

* cited by examiner

*Primary Examiner* — Igor Borissov
(74) *Attorney, Agent, or Firm* — Lathrop & Gage LLP

(57) ABSTRACT

A system and method store addresses within a database. An address and an address usage type that define an intended use of the address for an entity are captured. Address elements of the address are determined using an address template based upon the address usage type. If the address is not already stored within the database, an address entry having a new unique address identification number is created within an address table, each of the address elements are stored within an address element table of the database in association with the new unique address identification number, and an association entry is created within an address association table to associate the new unique address identification number with the entity, as well as to store the address usage type. If the address is already stored within the database, an existing unique address identification number for the address within the database is determined and an association entry within the address association table is created to associate the existing unique address identification number with the entity and to store the address usage type.

12 Claims, 11 Drawing Sheets

SYSTEMS AND METHODS FOR HANDLING ADDRESSES WITHIN A DATABASE APPLICATION

This application claims the benefit of priority of Provisional Application Ser. No. 61/027,258 filed Feb. 8, 2008, which is incorporated herein by reference.

BACKGROUND

Location addresses are often stored within a database for retrieval as needed. The format of these location addresses includes many inconsistencies that render the addresses difficult to maintain, organize and locate within the database. The United States Post Office has an address specification standard that lists acceptable formats for written addresses. Typically, in a database, addresses are simply entered as lines of text into designated fields of a database. For example, an address is often stored as three or four lines of text that may be retrieved in association with a key and used without further processing. Alternatively, an address may be broken down into many different elements, where each element is stored in association with a key. Upon retrieval, these elements can be formatted to regenerate the location address. Within the database, each address is typically associated with a person or an organization. For example, each element of the address may be stored as text within individual columns of a table that has an index field associated with the owning entity.

However, an address may be written in many different ways, especially where the address is written by different people. This variable nature of the data makes breaking the address down into individual fields more difficult, particularly where ordering of the individual fields may vary. Also, an address may contain abbreviations that vary depending upon the author of the address. For example, the street address "132 Main Street" may also be written as "132 Main St" or as "132 Main Str." Thus, when searching for an address stored as simple text lines, unless the correct format and abbreviations are used, a match for an existing address may not be found.

Where addresses are stored in a database in association with an entity such as a person or organization, use of these addresses is also often limited by that association, for privacy or other concerns.

Address storage is known to experience many common problems. The various elements of an address may be inconsistently formatted, and word abbreviations may be inconsistent. An address may have invalid formatting that makes it incompatible with and/or incomprehensible to a machine. Such inconsistencies often result in inadvertent storage of duplicate addresses. Furthermore, typical address storage systems and methods have an inability to share a single address among multiple entities, and in contrast, also have difficulty storing multiple addresses for a single entity. Many systems and methods are further unable to handle multiple postal address format standards, which can vary by country. Additionally, there are multiple types of non-postal addresses that experience storage problems similar to those seen with postal addresses, such as voice phone numbers, fax phone numbers and e-mail addresses.

DETAILED DESCRIPTION OF THE FIGURES

Figure 1:
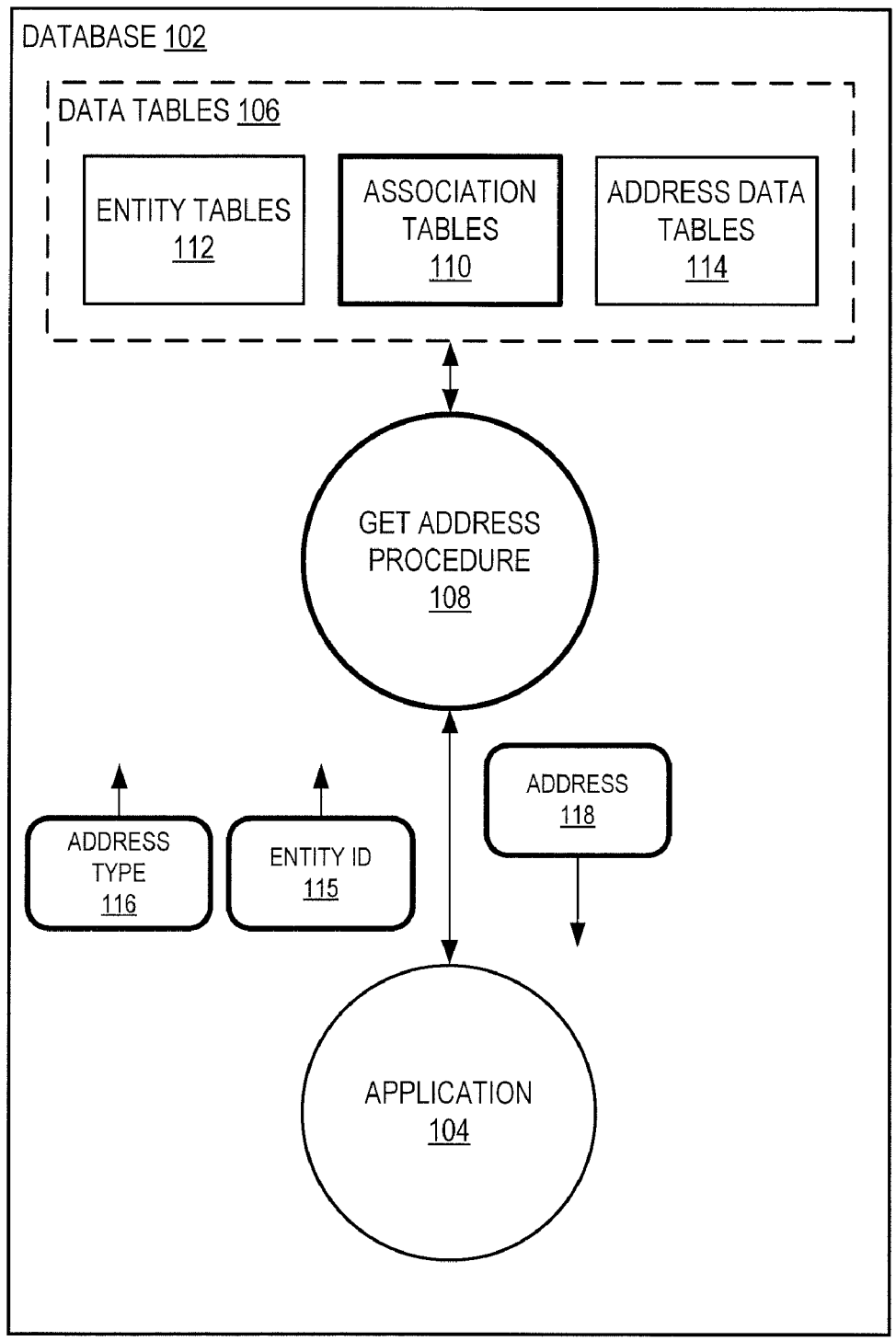
FIG. 1 shows an exemplary system embodiment for handling addresses within a database application.

FIG. 1 shows a block diagram illustrating one exemplary system 100 for handling location addresses within a database 102. Within database 102, data tables 106 include address information relating to one or more entities stored within database 102. Address data tables 114 may contain zero, one, or more addresses for each entity within entity tables 112. To retrieve a desired address for an entity, application 104 provides a get address procedure 108 with an entity ID 115 and an address type 116. Procedure 108 utilizes association tables 110 to retrieve address 118 from address data tables 114 based upon entity ID 115 and address type 116. Address type 116 is, for example, the type of address required by application 104 for entity ID 115, such as one of a general correspondence address, a work address, a billing address, etc.

Figure 2:
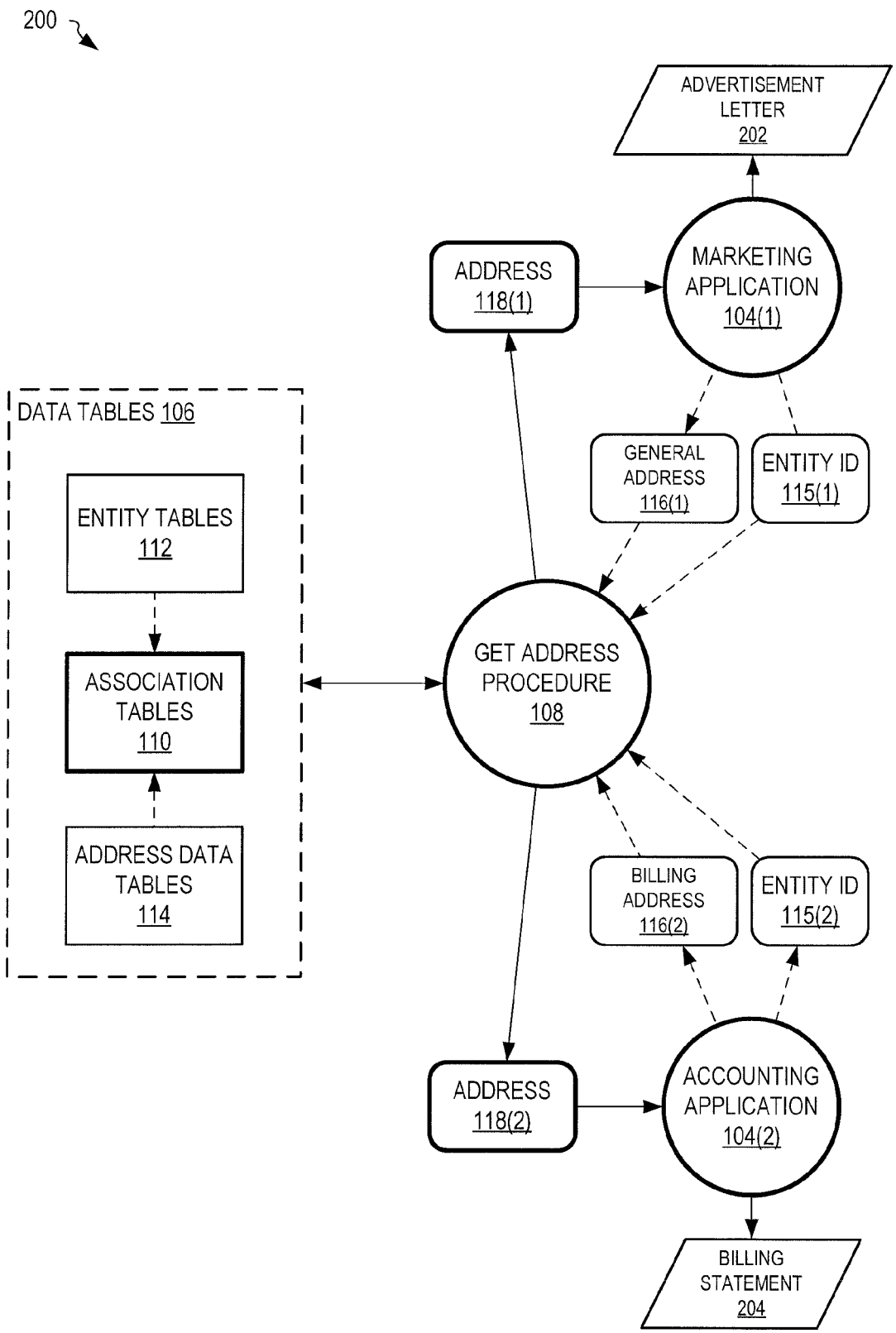
FIG. 2 shows an exemplary system embodiment for retrieving an address associated with an entity for a specific use.

FIG. 2 shows a block diagram 200 illustrating use of get address procedure 108 by a marketing application 104(1) and an accounting application 104(2). Marketing application 104 (1) invokes procedure 108 with an entity ID 115(1) and a general address type 116(1). Procedure 108 utilizes association tables 110 to retrieve an address 118(1) based upon entity ID 115(1) and general address type 116(1). Similarly, accounting application 104(2) invokes procedure 108 with an entity ID 115(2) and a billing address type 116(2). Procedure 108 utilizes association tables 110 to retrieve an address 118 (2) based upon entity ID 115(2) and billing address type 116(2). In the example of FIG. 2, marketing application 104 (1) utilizes address 118(1) to generate an advertisement letter 202 to be mailed to a customer identified by entity ID 115(1), and accounting application 104(2) utilizes address 118(2) to generate a billing statement 204 to be mailed to a client identified by entity ID 115(2).

Figure 3:
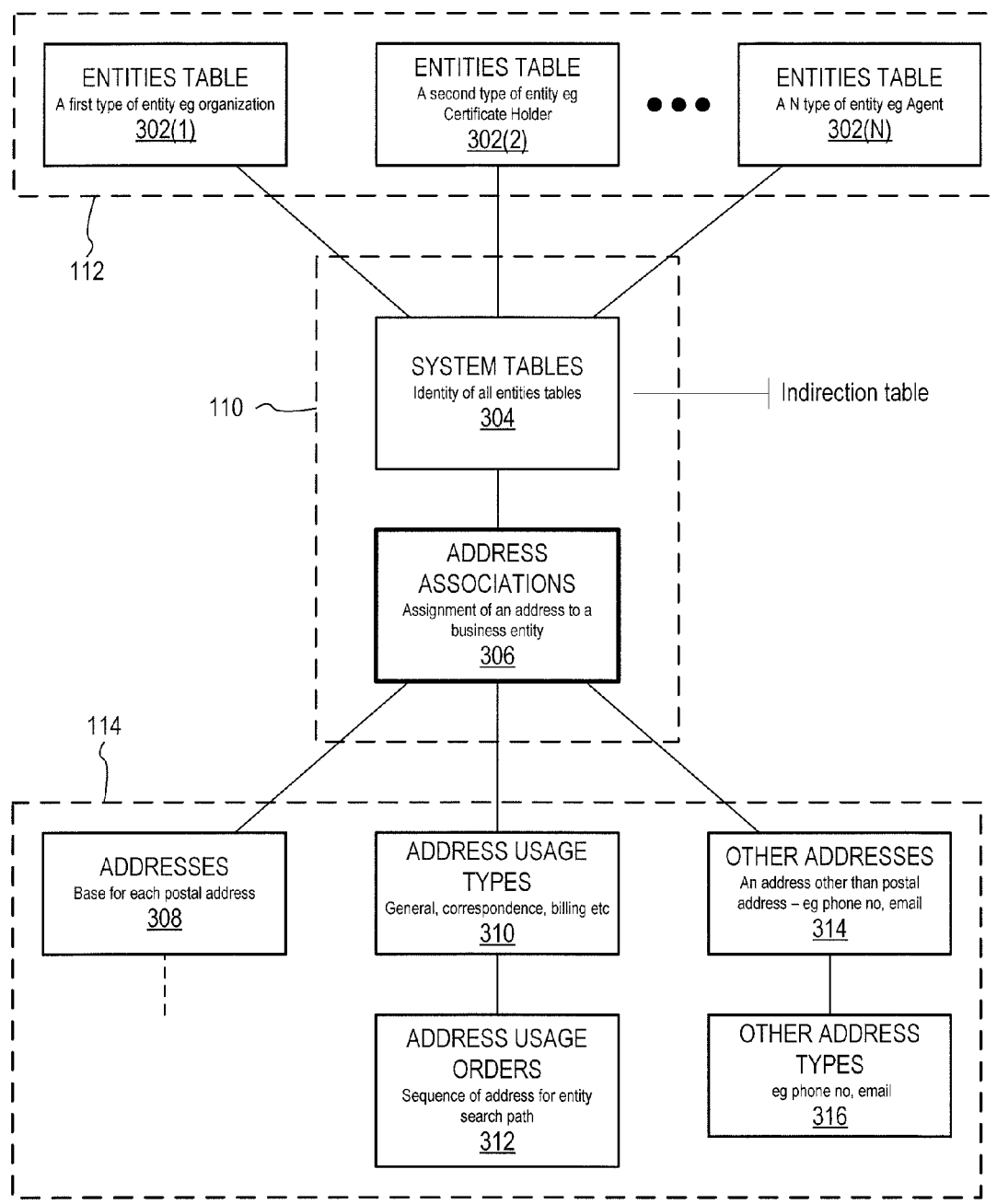
FIG. 3 shows an exemplary system embodiment illustrating how addresses (both postal and non-postal) are related to one or more business entities.
Figure 4:
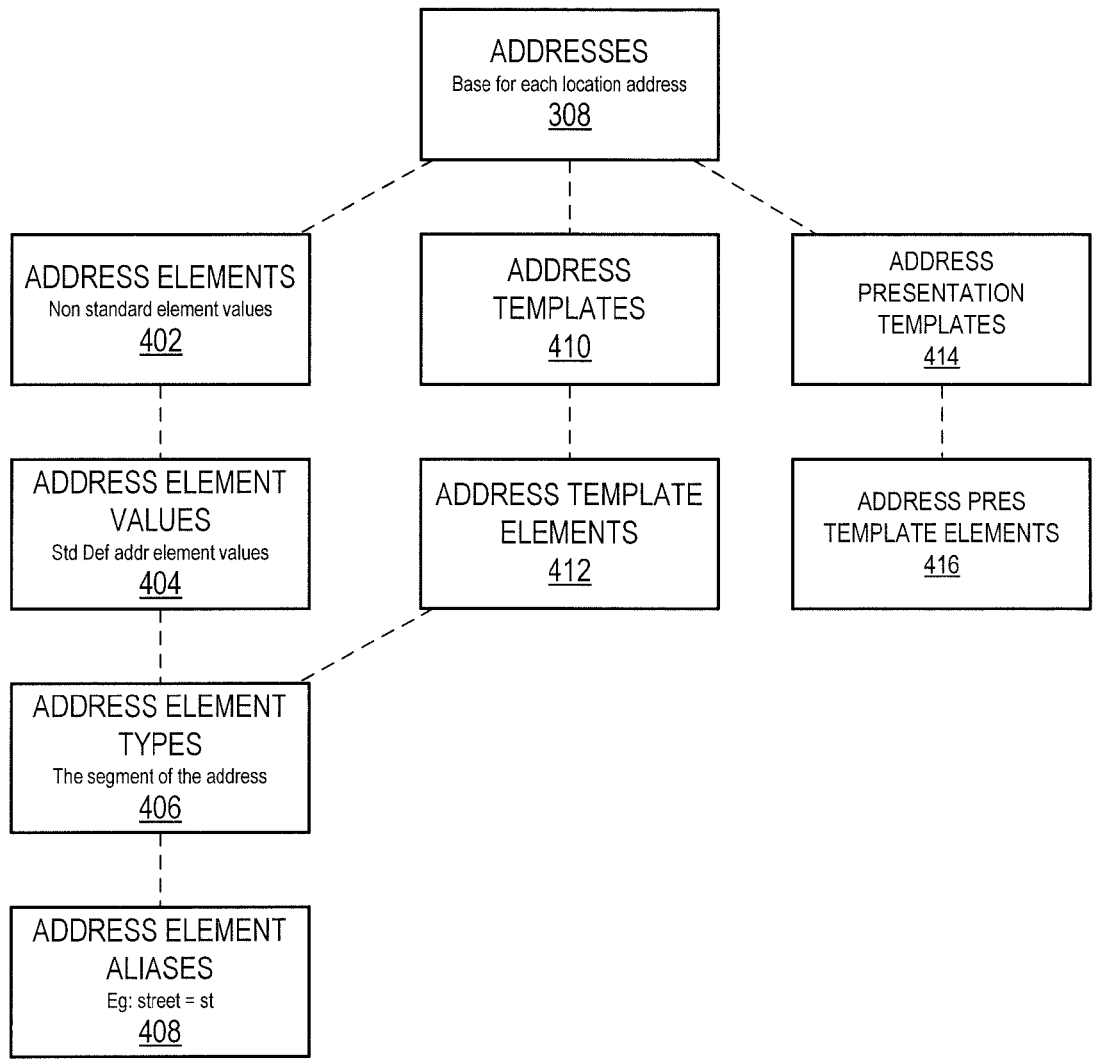
FIG. 4 is a block diagram showing relationships between the addresses table of FIG. 3 and other exemplary supporting tables of the database of FIG. 1.

FIG. 3 shows association tables 110, entity tables 112 and address data tables 114 of FIGS. 1 and 2 in further detail. Entities tables 112 are shown with a plurality of entities tables 302(1-N). These tables may represent one or more database tables containing entity identification information for entities that may be associated with zero or more addresses. For example, entities table 302(1) may represent organizational entities; entities table 302(2) may represent insurance certificate holders; and entities table 302(N) may represent agents for insurance providers. Entities within each of entities tables 302 may be associated with one or more addresses stored within address tables 114. Within address tables 114, an addresses table 308 may represent a base table for each stored postal address of database 102, FIG. 1. Exemplary columns of addresses table 308 are shown in Table 1 Addresses, below. Other tables may be linked to addresses table 308, as shown in FIG. 4, and described in further detail below. Addresses table 308 may also contain a search string column that allows addresses to be found by searching a single string for each address.

TABLE 1

Addresses

| Column Name | Column Type |
|---|---|
| ID | NUMBER(28,0) |
| VALID_ADDRESS | VARCHAR2(1) |
| ADDRESS_SOURCE | VARCHAR2(2) |
| SEARCH_STRING | VARCHAR2(50) |
| DATE_CREATED | DATE |
| CREATED_BY | VARCHAR2(30) |
| ADDT_ID | NUMBER(28,0) |
| DATE_MODIFIED | DATE |
| MODIFIED_BY | VARCHAR2(30) |

Association tables 110 are shown with a system tables 304 that contains one row for each entities table 302. Exemplary columns of system tables table 304 are shown in Table 2 System Tables, below. System tables 304 lists the database name with an associated short name for each entities table 302.

TABLE 2

System Tables

| Column Name | Column Type |
|---|---|
| TABLE_SHORT_NAME | VARCHAR2(10) |
| TABLE_NAME | VARCHAR2(30) |
| DISPLAY_NAME | VARCHAR2(50) |
| TABLE_EXISTS | VARCHAR2(1) |
| REFERENCE_CODE_LOOKUP | VARCHAR2(1) |
| TRANSACTION_DATA | VARCHAR2(1) |

For example, entities table 302(1) may have a database name of 'Organizations' and an alias of 'Org' stored within system tables 304. Thus, system tables 304 allows each of the entities tables 112 to be indirectly identified by their associated alias. The only requirement of each entities table 112 is a column name, or ID, that stores a unique key to rows of the table. Thus, by knowing the short table name of the entities table 112 and a key value for the entity stored within that table, that entity may be identified. This type of system allows multiple entity tables to be used for different types of entities, as described below.

Table 3 Organizations shows one exemplary entities table for storing a name or other identifier of a company, or other type of organization that represents a legal business entity. Organizations table stores each business entity identifier once and allows each to be identified in a generic way. Columns other than the one named 'ID' may be added as a matter of design choice.

TABLE 3

Organizations

| Column Name | Column Type |
|---|---|
| ID | NULL NUMBER(28,0) |
| IND_ID | NUMBER(28,0) |
| SIM_ID | NUMBER(28,0) |
| NAME | VARCHAR2(60) |
| TAX_ID | VARCHAR2(9) |
| TAX_ID_TYPE | VARCHAR2(1) |
| IRS_B_NOTICE | VARCHAR2(1) |
| IRS_B_NOTICE_DATE | DATE |
| IRS_W9_RECEIVED_DATE | DATE |
| ORGANIZATION_LEGAL_TYPE | VARCHAR2(3) |
| CURRENCY_TYPE | VARCHAR2(1) |
| ALLOW_SOLICITATIONS | VARCHAR2(1) |
| LEGAL_ACTION_PENDING | VARCHAR2(1) |
| NOTES | VARCHAR2(4000) |
| OLD_SYSTEM_ID | VARCHAR2(30) |
| EXTERNAL_ID | VARCHAR2(30) |
| TEST_USE_ONLY | VARCHAR2(1) |
| DATE_CREATED | DATE |
| CREATED_BY | VARCHAR2(30) |
| DATE_MODIFIED | DATE |
| MODIFIED_BY | VARCHAR2(30) |

Table 4 People shows exemplary columns for one entities table that provides a generic way to identify people that may have insurance coverage and/or have been identified because of a business relationship.

TABLE 4

People

| Column Name | Column Type |
|---|---|
| ID | NUMBER(28,0) |
| CODE | VARCHAR2(15) |
| SSN | VARCHAR2(9) |
| SSN_TIE_BREAKER | NUMBER(2) |
| LAST_NAME | VARCHAR2(60) |
| FIRST_NAME | VARCHAR2(30) |
| MIDDLE_NAME | VARCHAR2(30) |
| NICK_NAME | VARCHAR2(15) |
| ONE_WORD_NAME | VARCHAR2(1) |
| NAME_SUFFIX | VARCHAR2(5) |
| NAME_SALUTATION | VARCHAR2(10) |
| TITLE | VARCHAR2(30) |
| PIN | VARCHAR2(20) |
| GENDER | VARCHAR2(1) |
| LEGAL_ACTION_PENDING | VARCHAR2(1) |
| CITIZEN_STATUS | VARCHAR2(1) |
| ALLOW_SOLICITATIONS | VARCHAR2(1) |
| FULL_TIME_STUDENT | VARCHAR2(1) |
| IRS_W9_RECEIVED | VARCHAR2(1) |
| IRS_B_NOTICE | VARCHAR2(1) |
| IRS_B_NOTICE_DATE | DATE |
| TEST_USE_ONLY | VARCHAR2(1) |
| SIM_ID_PHOTO_IMAGE | NUMBER(28) |
| SIM_ID_SIG_IMAGE | NUMBER(28) |
| O_ID | NUMBER(28) |
| STUDENT_VERIFICATION_DATE | DATE |
| DATE_OF_BIRTH | DATE |
| DATE_OF_DEATH | DATE |
| LETTER_DELIVERY_METHOD_PREF | VARCHAR2(1) |
| ANNUAL_WAGES | NUMBER(11,2) |
| HEIGHT_VALUE | NUMBER(6,3) |
| HEIGHT_UNIT_OF_MEASURE | VARCHAR2(1) |
| WEIGHT_VALUE | NUMBER(7,3) |
| WEIGHT_UNIT_OF_MEASURE | VARCHAR2(1) |
| MEDICARE_ELIGIBILITY_DATE | DATE |
| MEDICARE_BENEFIT_DATE | DATE |
| CUSTOMER_PRIORITY | NUMBER(2) |
| EXTERNAL_ID | VARCHAR2(30) |
| DATE_CREATED | DATE |
| CREATED_BY | VARCHAR2(30) |

TABLE 4-continued

People

| Column Name | Column Type |
| --- | --- |
| DATE_MODIFIED | DATE |
| MODIFIED_BY | VARCHAR2(30) |

An address associations table 306 stores an association identifier between location addresses stored within addresses table 308 and zero, one, or more entities of entities tables 302. That is, although an entity need not have an associated address, an entity may have more than one associated address. Each address associated with an entity of entities tables 302 has an entry within address associations table 306.

Exemplary columns of address associations table 306 are shown in Table 5 Address Associations. Of particular interest, columns ACTIVE_START_MONTH and ACTIVE_DURATION allow an associated address to be periodic. For example, by associating a first address with an active start month of March, and an active duration of six months, and a second address with an active start month of August, and an active duration of six months, mail can be sent to a correct location for a person that has both a summer and winter home address. Where an entity has such periodic address association, validation ensures that an address can be properly associated during the entire year.

TABLE 5

Address Associations

| Column | Type |
| --- | --- |
| ID | NUMBER (28, 0) |
| AUT_ID | NUMBER (28, 0) |
| OA_ID | NUMBER (28, 0) |
| ADDR_ID | NUMBER (28, 0) |
| ST_TABLE_SHORT_NAME | VARCHAR2 (10) |
| KEY_VALUE | NUMBER (28, 0) |
| OBSOLETE | VARCHAR2 (1) |
| ACTIVE_START_MONTH | NUMBER (2, 0) |
| ACTIVE_DURATION | NUMBER (2, 0) |
| MAIL_LOCATION | VARCHAR2 (60) |
| DATE_CREATED | DATE |
| CREATED_BY | VARCHAR2 (30) |
| DATE_MODIFIED | DATE |
| MODIFIED_BY | VARCHAR2 (30) |

As shown in Table 5 Address Associations, address associations table 306 has a column MAIL_LOCATION that allows an address to have a specific mail location without requiring multiple address entries. That is, by including the MAIL_LOCATION within address association table 306, the address stored within addresses table 308 remains generic, while allowing for the flexibility of including the mail stop within the output address.

Since each address is stored only once, if one or more elements of that address are changed, only one amendment need occur (i.e., amendments for each addressee are not required). Storing each address only once also saves space within the database.

The use of address associations table 306 also allows fraud detection, since entering of a new address will allow similar addresses to be found, thereby highlighting use of the same address by more than one entity. According to the present system, multiple entities can be associated with the same address. Nevertheless, the system still may flag such instances for further verification.

An address usage types table 310 and an address usage orders table 312 are associated, by the address associations table 306, with the address stored in addresses 308. The address usage types table 310 specifies the intended use of the address in association with the associated entity. Exemplary columns of address usage types table 310 are shown in Table 6 Address Usage Types.

TABLE 6

Address Usage Types

| Column Name | Column Type |
| --- | --- |
| ID | NUMBER (28, 0) |
| ST_TABLE_SHORT_NAME | VARCHAR2 (10) |
| NAME | VARCHAR2 (30) |
| REQUIRE_VALID_ADDRESS | VARCHAR2 (1) |
| ALLOW_MULTIPLE_ADDRESSES | VARCHAR2 (1) |
| NOTES | VARCHAR2 (4000) |
| DATE_CREATED | DATE |
| CREATED_BY | VARCHAR2 (30) |
| DATE_MODIFIED | DATE |
| MODIFIED_BY | VARCHAR2 (30) |

Each entry within address usage types table 310 has a corresponding entry within address usage orders table 312 that specifies an order for the associated address that may be used where multiple addresses are associated with one entity. The order may also be used to determine a sequence for searching for an address. The first existing address in the search sequence may be used. For example, an entry in entities table 112 has an association within address association 306 to an address within addresses table 308, an associated usage type of "billing" within address usage types table 310, another association within address association table 306 to an address within address table 308, and an associated usage type of "general" within address usage types table 310. In other words, the associated entity has a "billing" address and a "general" address. If the "billing" address is defined with an order search sequence of "1" within the address usage orders table 312, and the "general" address is defined with an order search sequence of "2," the "billing" address may override the "general" address when no specific address type is requested.

Exemplary columns of address usage orders table 312 are shown in Table 7 Address Usage Orders.

TABLE 7

Address Usage Orders

| Column Name | Column Type |
| --- | --- |
| ID | NUMBER (28, 0) |
| AUT_ID_ALTERNATE | NUMBER (28, 0) |
| AUT_ID_CONTEXT | NUMBER (28, 0) |
| SEARCH_SEQUENCE | NUMBER (2, 0) |
| DATE_CREATED | DATE |
| CREATED_BY | VARCHAR2 (30) |
| DATE_MODIFIED | DATE |
| MODIFIED_BY | VARCHAR2 (30) |

Address associations table 306 may also associate other addresses, such as email addresses, URLs, telephone numbers, facsimile numbers, etc., that are stored in an other addresses table 314. Other addresses table 314 is used to store non-postal addresses (e.g., addresses that are not stored within addresses table 308). Each address association of address associations table 306 is thus either associated with a postal address of addresses table 308, or an "other address" (i.e., non-postal address) of other addresses table 314.

An other address types table 316 may be linked to other addresses table 314, and specify a type (e.g., email address, URL, telephone number, facsimile number, etc.) of each other address stored within the corresponding row of other addresses table 314.

TABLE 8

Other Address Types

| Name | Type |
|---|---|
| ID | NUMBER(28,0) |
| NAME_1 | VARCHAR2(30) |
| NAME_2 | VARCHAR2(30) |
| FORMAT_DESCRIPTION | VARCHAR2(4000) |
| DATE_CREATED | DATE |
| CREATED_BY | VARCHAR2(30) |
| NOTES | VARCHAR2(4000) |
| DATE_MODIFIED | DATE |
| MODIFIED_BY | VARCHAR2(30) |

TABLE 9

Other Address Valid Types

| Name | Type |
|---|---|
| ID | NUMBER(28,0) |
| OAT_ID | NUMBER(28,0) |
| AUT_ID | NUMBER(28,0) |
| DATE_CREATED | DATE |
| CREATED_BY | VARCHAR2(30) |
| DATE_MODIFIED | DATE |
| MODIFIED_BY | VARCHAR2(30) |

TABLE 10

Other Addresses

| Name | Type |
|---|---|
| ID | NUMBER(28,0) |
| OAT_ID | NUMBER(28,0) |
| ADDR_ID | NUMBER(28,0) |
| ADDRESS_VALUE_1 | VARCHAR2(200) |
| ADDRESS_VALUE_2 | VARCHAR2(200) |
| LONG_DISTANCE | VARCHAR2(1) |
| DATE_CREATED | DATE |
| CREATED_BY | VARCHAR2(30) |
| DATE_MODIFIED | DATE |
| MODIFIED_BY | VARCHAR2(30) |

Since multiple entries may exist within address associations table 306 for each entity of entities tables 112, each type of address that the entity has may also be stored within database 102 and associated with the entity. Thus, when marketing application 104(1) utilizes procedure 108 to retrieve an address for a specific entity, association tables 110 may facilitate retrieval of the most appropriate address type (i.e., a general address in the example of FIG. 2) stored for that entity. If the requested type of address is not available for the specified entity, the next most appropriate address may be retrieved, which may also be associated with a different entity.

An address, as like those stored in address data tables 114, may be one of a location address (e.g., a postal address), a telephone number, a facsimile number, an email address, a web site URL, an FTP address, etc. For example: "911 Broadway St, Kansas City Mo. 64105-1508" is an exemplary postal address. Each address may also be divided into component parts, hereinafter designated as elements. For example, the United States Postal Service and the mailing industry have jointly developed a postal addressing standard document, which defines standards for presenting postal addresses. These standards include uniform methods for matching addresses against information in Address Information System (AIS), product information, and the definition of formats for outputting addresses (e.g., when addressing mail). As an example, each element of an address may have a defined format and a defined set of characters. A standardized address thus would be fully spelled out, abbreviated by using Postal Service standard abbreviations, and/or properly formatted for the address style. Once an address is divided into elements, these elements may be validated against one or more of a zip-code database, and a city-state database. The following description illustrates one exemplary method of storing such addresses within database 102 of FIG. 1.

Using an exemplary postal address, the "delivery address line" of a mailing may read as "911 Broadway St." and its "last line" read as "Kansas City Mo. 64105-1508." The available elements in an address may be determined by the address templates table 410, FIG. 4, described below. In one example of a United States template, the delivery address line is formed of the following elements: a primary address door number; a predirectional indicator; a street name; a suffix; a postdirectional indicator; a secondary address identifier; and a secondary address. The last line may be formed of the following elements: a city; a state; and a zip+4 code. An exemplary storage and output format of these address elements within database 102 is shown in FIG. 4, and described below. As may be appreciated, address field elements vary from area to area and country to country. The following is an example only, and additional elements and formats may be included without departing from the scope hereof.

FIG. 4 is a block diagram showing relationships between addresses table 308 of FIG. 3 and other exemplary supporting tables of database 102, FIG. 1. As noted above, addresses table 308 represents a base table for each stored postal address. Each row within addresses table 308 may be linked with one or more entries of an address elements table 402, one entry of address templates table 410 and one entry of an address presentation templates table 414. Exemplary columns of address elements table 402 are shown in Table 11 Address Elements.

TABLE 11

Address Elements

| Column Name | Column Type |
|---|---|
| ID | NUMBER (28, 0) |
| ADDR_ID | NUMBER (28, 0) |
| VALUE | VARCHAR2 (80) |
| AEV_ID | NUMBER (28, 0) |
| AE_TYPE | VARCHAR2 (10) |
| ATE_ID | NUMBER (28, 0) |
| DATE_CREATED | DATE |
| CREATED_BY | VARCHAR2 (30) |
| DATE_MODIFIED | DATE |
| MODIFIED_BY | VARCHAR2 (30) |

Each row of address elements table 402 may have an associated row within address element values table 404 where the address element has been validated and/or corrected to confirm to a standardized address format. For example, column AEV_ID of address elements table 402 may identify a row within address element values table 404 where the address element is a standard value defined by the postal service, such as "Street" and "Road." Where an address element is not matched to a standard value defined by the postal service, such as "Broadway," there is no reference to address element values table 404, and the entry within address elements table 402 includes the element text (i.e., "Broadway" in this example) within the value field. That is, the value field within address elements 402 may be used where a reference to an entry in address elements values table 404 is omitted.

Exemplary columns of address element values table 404 are shown in Table 12 Address Element Values. A text position column defines a position of the element value within the search string column of an associated addresses table 308 row. For example, each row of addresses table 308 contains a text string formed by concatenating address element values (with all spaces removed), and in the order defined by the text position of the element. This search string allows similar addresses to be found easily when searching within database 102 (i.e., use of the string may be quicker than reconstructing each address from its elements to perform a search). This use of the element types also allows search rules to be used that specify which parts of the address are used for searches.

TABLE 12

Address Element Values

| Column Name | Column Type |
| --- | --- |
| ID | NUMBER (28, 0) |
| AET_ID | NUMBER (28, 0) |
| VALUE | VARCHAR2 (80) |
| TEXT_POSITION | VARCHAR2 (1) |
| DATE_CREATED | DATE |
| CREATED_BY | VARCHAR2 (30) |
| DATE_MODIFIED | DATE |
| MODIFIED_BY | VARCHAR2 (30) |

Each row of address element values table 404 is linked to an entry within address element types table 406 that specifies the type of element value stored in the value column of the linked row of address element values table 404. For example, a door number, a street directional indicator, a street name, a street suffix, an apartment or suite number, a city, a state, and a zip code/zip+4 code are element types that correspond to the US postal service element names of primary address number, predirectional indicator, street name, suffix, postdirectional, secondary address identifier, secondary address, city, state, and zip+4 code, respectively. Elements of each type though, do not necessarily appear in each address. Exemplary columns of address element types table 406 are shown in Table 13 Address Element Types.

TABLE 13

Address Element Types

| Column Name | Column Type |
| --- | --- |
| ID | NUMBER (28, 0) |
| CTRY_ID | NUMBER (28, 0) |
| NAME | VARCHAR2 (80) |
| MIN_LENGTH | NUMBER (2) |
| MAX_LENGTH | NUMBER (2) |
| FORMAT_CASE | VARCHAR2 (1) |
| FORMAT_MASK | VARCHAR2 (80) |
| DESCRIPTION | VARCHAR2 (4000) |
| VALID_ELEMENT | VARCHAR2 (1) |
| DATE_CREATED | DATE |
| CREATED_BY | VARCHAR2 (30) |
| DATE_MODIFIED | DATE |
| MODIFIED_BY | VARCHAR2 (30) |

Where an address element value (i.e., as stored in address element values table 404) has an abbreviation or alias, that abbreviation or alias may be stored within address element aliases table 408. For example, a row within address element values table 404 may have an element value of "street" and a linked row in address element aliases with a value of "st; thus, "st" is an alias for "street." Exemplary columns of address element aliases table 408 are shown in Table 14 Address Element Aliases. Such aliases can be pre-defined and based upon the appropriate postal standards (e.g., USPS Postal Standards in the USA).

Certain address elements may be validated against other address elements based upon address element type. For example, for elements of a single address, an address element value with an address element type of ZIP+4 may be validated against an address element value with an address element type of STATE using an additional STATE/ZIP database. In another example, for elements of a single address, an address element value with an address element type of CITY may be validated against an address element value with an address element type of state using an additional CITY/STATE database. Optionally, one or more other additional databases may be used to validate other address element values of an address. For example, door number address element values may be evaluated against street name and zip code address element values.

TABLE 14

Address Element Aliases

| Column Name | Column Type |
| --- | --- |
| ID | NUMBER (28, 0) |
| AEV_ID | NUMBER (28, 0) |
| VALUE | VARCHAR2 (80) |
| DATE_CREATED | DATE |
| CREATED_BY | VARCHAR2 (30) |
| DATE_MODIFIED | DATE |
| MODIFIED_BY | VARCHAR2 (30) |

Each row of addresses table 308 may also be linked to an address templates table 410 that is linked to one or more rows within address template elements table 412. Address templates table 410 is a base table for storing one or more address templates. An address template groups together the address element types that can make up an address standard, regardless of their order, output, or presentation. An address template may be used to capture (input) an address. Thus, address elements may be organized for each address format standard (e.g., for each country, or for different address formats within one country). Exemplary columns of address templates table 410 are shown in Table 15 Address Templates.

TABLE 15

Address Templates

| Column Name | Column Type |
| --- | --- |
| ID | NUMBER (28, 0) |
| CTRY_ID | NUMBER (28, 0) |
| NAME | VARCHAR2 (80) |
| DISPLAY_ORDER | NUMBER (3, 0) |
| DESCRIPTION | VARCHAR2 (4000) |
| DATE_CREATED | DATE |
| CREATED_BY | VARCHAR2 (30) |
| DATE_MODIFIED | DATE |
| MODIFIED_BY | VARCHAR2 (30) |
| ID | NUMBER (28, 0) |

Each address template of address templates table 410 can specify a particular address format. Address template elements table 412 contains rows that identify address element types that form the address template of the associated row of address templates table 410. Exemplary columns of address template elements table 412 are shown in Table 16 Address Template Elements.

TABLE 16

Address Template Elements

| Column Name | Column Type |
| --- | --- |
| ID | NUMBER (28, 0) |
| ADDT_ID | NUMBER (28, 0) |
| AET_ID | NUMBER (28, 0) |
| OPTIONAL | VARCHAR2 (1) |
| USE_IN_SEARCH_STRING | VARCHAR2 (1) |
| DATE_CREATED | DATE |
| CREATED_BY | VARCHAR2 (30) |
| DATE_MODIFIED | DATE |
| MODIFIED_BY | VARCHAR2 (30) |

Presentation of an address (i.e., output to a screen, output to a printer as labels and/or envelopes, etc.) is based upon the address presentation templates table 414 and the address presentation template elements table 416. These tables can define an order, a line number, and some position delimiters for each element of an address. Exemplary columns of Address presentation templates table 414 are shown in Table 17. Exemplary columns of address presentation template elements table 416 are shown in Table 18.

TABLE 17

Address Presentation Templates

| Column Name | Column Type |
| --- | --- |
| ID | NUMBER (28, 0) |
| ADDT_ID | NUMBER (28, 0) |
| NAME | VARCHAR2 (80) |
| INPUT_TEMPLATE | VARCHAR2 (1) |
| FONT | VARCHAR2 (2) |
| FONT_SIZE | NUMBER (2) |
| MAXIMUM_CHARACTERS_PER_LINE | NUMBER (3) |
| DESCRIPTION | VARCHAR2 (4000) |
| DATE_CREATED | DATE |
| CREATED_BY | VARCHAR2 (30) |
| DATE_MODIFIED | DATE |
| MODIFIED_BY | VARCHAR2 (30) |

In particular, address presentation templates table 414 specifies general information relating to the presentation of an address, such as a font type, a font size, and the maximum characters per line. Address presentation template elements table 416 specifies a line number, a line position number, and a separator character for each type of address element.

TABLE 18

Address Presentation Template Elements

| Column Name | Column Type |
| --- | --- |
| ID | NUMBER (28, 0) |
| APT_ID | NUMBER (28, 0) |
| ATE_ID | NUMBER (28, 0) |
| LINE_NUMBER | NUMBER (2, 0) |
| LINE_POSITION_NUMBER | NUMBER (2, 0) |
| SEPARATOR_CHARACTER | VARCHAR2 (10) |
| DATE_CREATED | DATE |
| CREATED_BY | VARCHAR2 (30) |

TABLE 18-continued

Address Presentation Template Elements

| Column Name | Column Type |
| --- | --- |
| DESCRIPTION | VARCHAR2 (4000) |
| DATE_MODIFIED | DATE |
| MODIFIED_BY | VARCHAR2 (30) |

Where formatting templates are not available (e.g., an address for a country not having an address template), or where an address does not comply with a particular template, unformatted text may be entered.

Figure 8:
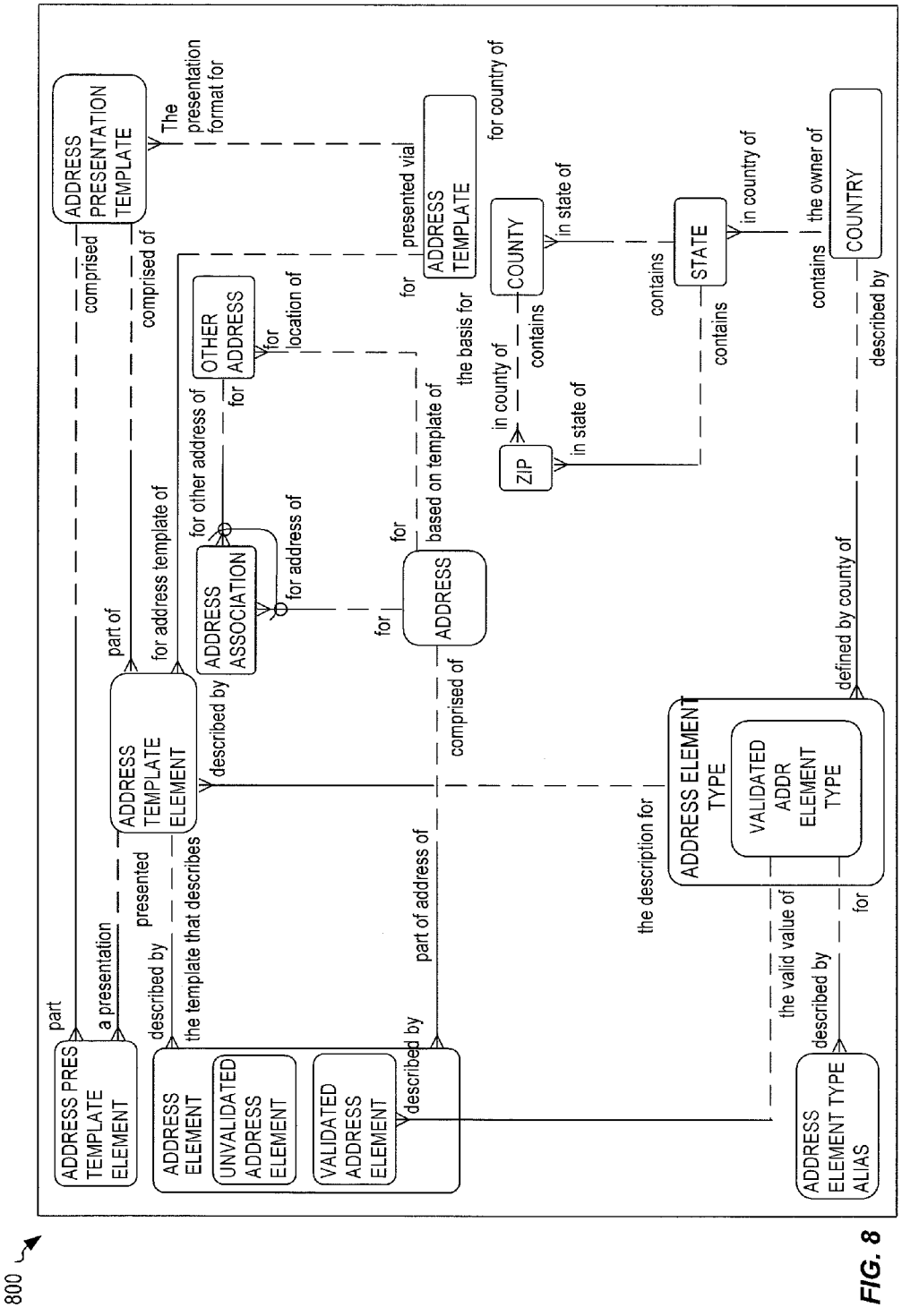
FIG. 8 shows one exemplary entity relationship diagram based upon the data tables of FIG. 1.

FIG. 8 shows one exemplary entity relationship diagram (ERD) 800 based upon data tables 106 of FIG. 1. In particular, ERD 800 shows database entity relationships for one exemplary implementation of address handling within a database application.

Figure 5:
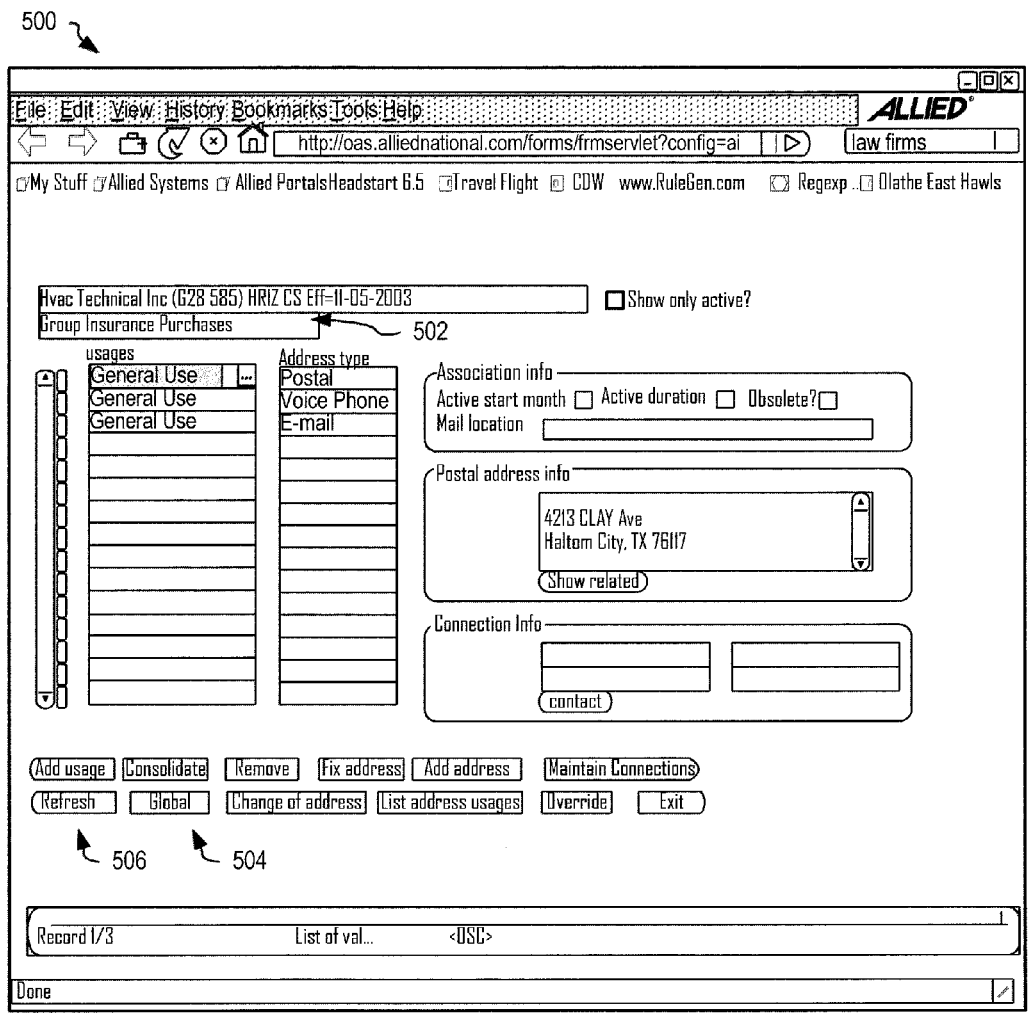
FIG. 5 shows one exemplary screen shot of an address maintenance form illustrating multiple address associations for a single entity.

FIG. 5 shows one exemplary screen shot of an address maintenance form 500 illustrating multiple address associations for a single entity (i.e., HVAC Technical, Inc, in this example). In particular, a general use address of the type 'postal' is displayed, and residential, phone, and email addresses are shown as having been defined for this entity. A context field 502 specifies the context of the selected address. In one example, the context of the address may be expanded to include those associated with the organizations table through use of a global button 504. The use of a refresh button 506, in this example, resets the context for the addresses to the original context table.

Figure 6:
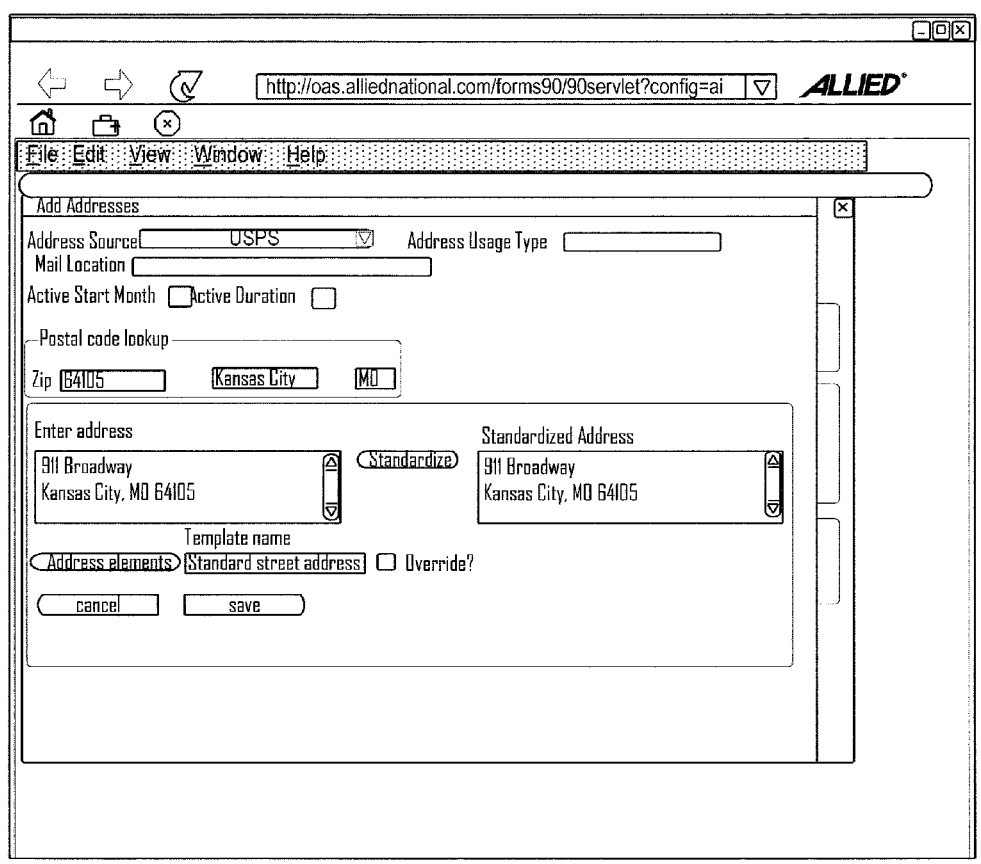
FIG. 6 shows one exemplary screen shot of an address entry form illustrating standardization of an entered address.

FIG. 6 shows one exemplary screen shot of an address entry form 600 illustrating standardization of an entered address. In particular, form 600 shows a postal code lookup feature that allows verification of an entered postal code against city and state. In this example, the entered address is in standardized form, based upon a standard street address template.

Figure 7:
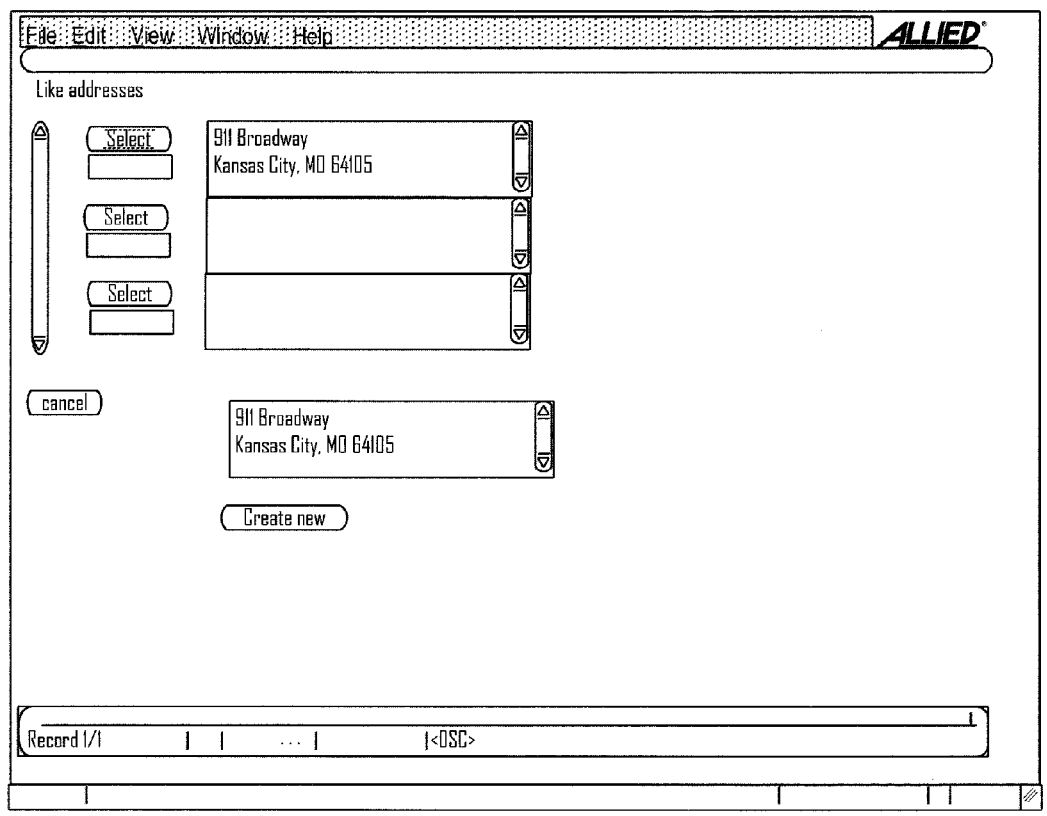
FIG. 7 shows one exemplary screen shot of a similar address list form illustrating identification of a similar stored address to an entered address.

FIG. 7 shows one exemplary screen shot of a similar address list form 700 illustrating a comparison of a stored address to a similar entered address. In particular, a single similar address is shown resulting from an address search, based upon the entered address. This search facilitates selection of an existing address within the database. The entered address, for example, has left off the boulevard suffix from the end of the first line, but is matched to an existing similar address that has been standardized (i.e., boulevard is abbreviated as Blvd). The display of similar addresses allows a selection of the correct address, even when an address is entered incorrectly or is incompletely, thereby helping to avoid multiple entries for a single address.

If a person moves, a new address for the person can be further entered, validated, and stored. The original address can remain within the system, since it may still be used again, and/or it may still be in use by another entity. When a new address is added, it can be compared to existing addresses, similarly to the process described above. If a match is found, a user inputting the address may be asked to confirm that the input address is the same as the matched address, such that the matched address is used instead of adding the new address as a duplicate address.

Figure 9:
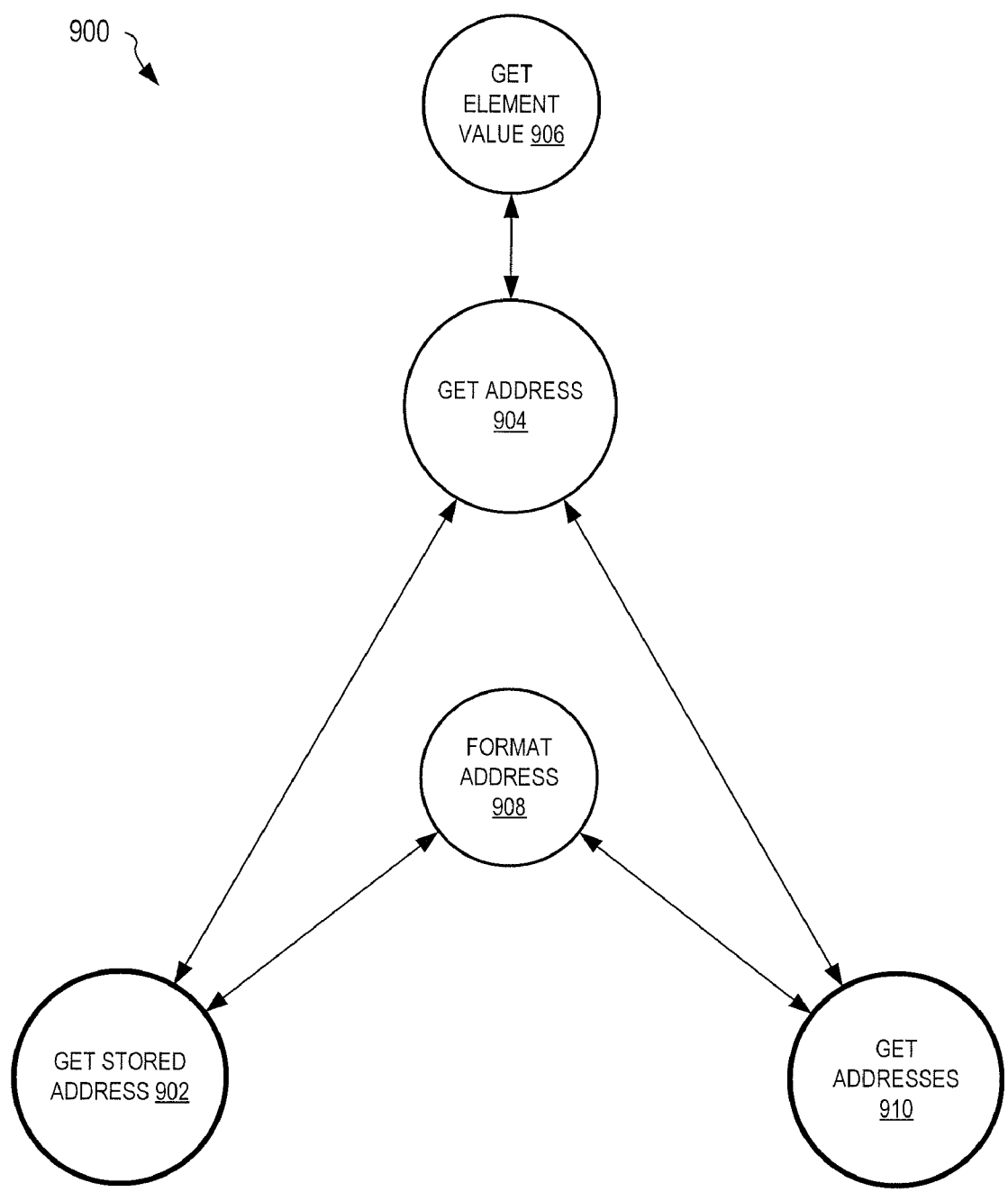
FIG. 9 is a graph showing exemplary procedure hierarchy for retrieving addresses within the system of FIG. 1.

FIG. 9 is a flowchart showing a procedure hierarchy 900 for retrieving addresses from system 100 (as best seen in FIG. 1). A get stored address procedure 902 invokes a get address procedure 904, which in turn invokes a get element value procedure 906 to get address information from data tables 106. In particular, the get address procedure 904 may invoke the get element value procedure 906 multiple times to get each available element of an address. The get stored address procedure 902 may then invoke a format address procedure 908 to format the returned address according to a specified address format. The get stored address procedure 902 may represent the get address procedure 108 of FIG. 1.

Hierarchy 900 is also shown with a get addresses procedure 910 that returns all addresses associated with an entity, and that may also invoke the format address procedure 908 to format each returned address according to its associated format type.

Figure 10:
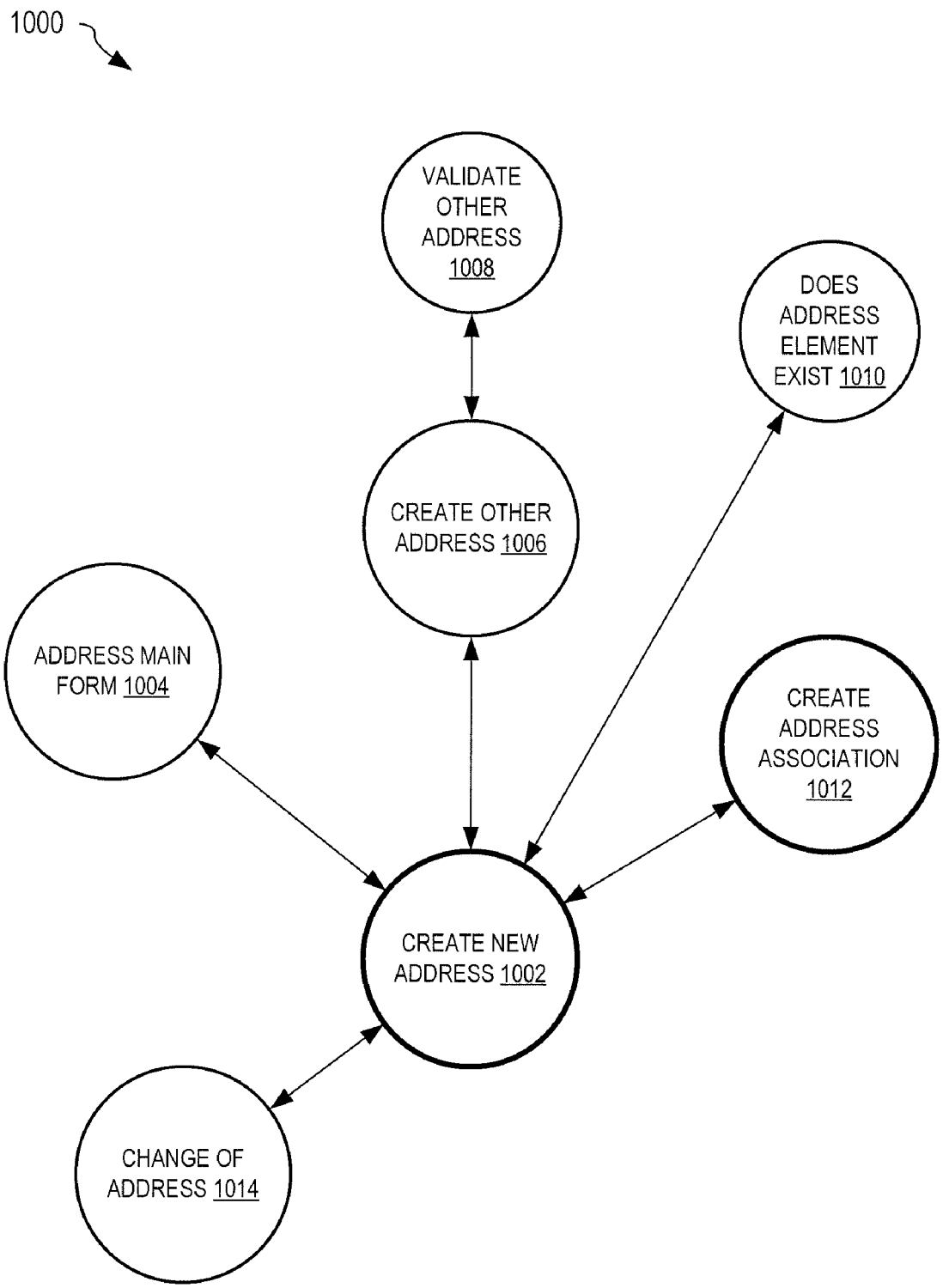
FIG. 10 is a graph showing exemplary procedure hierarchy for creating a new address within the system of FIG. 1.

FIG. 10 is a graph showing a procedure hierarchy 1000 for creating a new address within system 100 (FIG. 1). A create new address procedure 1002 invokes an address main form procedure 1004 to display and capture the new address interactively. The create new address procedure 1002 may then invoke a create other address procedure 1006, which may in turn validate the new address by invoking a validate other address procedure 1008 to capture non-standard address formats. The create new address procedure 1002 may invoke a does address element exist procedure 1010 to identify duplicate address elements, and to help prevent duplicate entries within the data tables 106. Once the new address is validated, the create new address 1002 may invoke a create address association procedure 1012 to create a new association for the address, whereby a postal address is associated with one or more entities. In one embodiment, the create address association procedure 1012 utilizes the system tables 304 to provide an indirection between the address and one of a plurality of entities tables 302. In one example of operation, the create address association procedure 1012 creates an entry within the address associations table 306 that associates the postal address with at least one entity of entities tables 302.

Create new address procedure 1002 may be invoked by a change of address procedure 1014 that is called to change an existing address for an entity. Where an address already exists within the system 100, the change of address 1014 may create a new association to that address using the create address association procedure 1012. Where a new address is entered, the change of address procedure 1014 may invoke the create new address procedure 1002.

Exemplary Data

To further describe use of system 100 (see FIG. 1), the following tables contain exemplary data to illustrate inter-table relationships of database 102. Two exemplary rows of Addresses table 308 are shown in Table 19 Addresses Table Example Data.

TABLE 19

Addresses Table Example Data

| ID | VALID_ADDRESS | ADDRESS_SOURCE | SEARCH_STRING |
|---|---|---|---|
| 186559 | Y | 13 | 3532CECIL951 |
| 999 | Y | 13 | 1867APPLE805 |

Each row in this example has an ID value (e.g., "186559" or "999") that specifically identifies one address. This ID value may be used as a common identifier between multiple elements that form an identified address. Each row also has a search string that is constructed from part or all of one or more elements of the identified address. This search string facilitates fast searches for a specific address within database 102, since by utilizing the search string within the addresses table, fewer table joins are required to perform the search.

TABLE 20

Address Usage Type Example Data

| ID | ST_TABLE | NAME | Require Valid | Allow Multiple |
|---|---|---|---|---|
| 11 | GIP | Billing Statement | Y | N |
| 13 | GIP | General Use | Y | N |
| 14 | GIP | Alternative Address | Y | N |
| 16 | ORG | Correspondence | Y | N |
| 17 | I | Utilization Review | Y | N |
| 18 | CERT | General Use | Y | N |
| 19 | I | Insured EOB | Y | N |
| 20 | ORG | Provider Payments | Y | N |
| 22 | ORG | General Use | Y | N |
| 23 | PEP | General Use | Y | N |
| 24 | I | General Use | Y | N |
| 34 | CERT | Voice Phone | Y | N |
| 35 | GIP | Voice Phone | Y | N |
| 36 | GIP | Fax | Y | N |
| 37 | GIP | E-Mail | Y | N |
| 48 | I | Voice Phone | Y | N |
| 49 | ORG | Voice Phone | Y | N |
| 50 | ORG | Fax | Y | N |
| 51 | ORG | E-Mail | Y | N |
| 52 | PEP | Voice Phone | Y | N |
| 53 | PEP | Fax | Y | N |
| 54 | PEP | E-Mail | Y | N |
| 62 | PEP | Person EOB | Y | N |

Table 20 Address Usage Type Example Data shows exemplary address usage for five entity tables, Insureds, People, Certificates, Organizations, and Group Insurance Purchases, as identified by the entity table's short names, "I," "PEP," "CERT," "ORG," and "GIP," respectively. In one such example, entities within the People table may have address usage types of "General Use," "Voice Phone," "Fax," "E-Mail" and "Person EOB." Each address may have an associated address usage type ID value (e.g., "52" for a "Voice Phone" address type used within the People entity table) for specifying an intended use for the address.

Table 21 Address Usage Order Example Data shows exemplary address usage orders for address usage types of Insureds: "Insured EOB" and Insureds: "General Use." In this example, there are five alternate address usage types for "Insureds: Insured EOB," such that if one address is not available for use, an alternate may be found based upon the specified search sequence ordering. More specifically, in the context of an insured (st_table_short_name="I" and key value), if no address exists of type "Insured EOB," then the system searches for an address of type "General Use" associated with st_table_short_name="I." If no such address exists, then the system searches for an address of type "General Use" associated with st_table_short_name="CERT." This process may continue with all five exemplary alternatives in the search, and the process may not result in any found address. The above is only one example of address searching. Other rules for address searching may be used without departing from the scope hereof.

TABLE 21

Address Usage Order Example Data

| ID | AUT_ID_ALTERNATE | AUT_ID_CONTEXT | SEARCH_SEQUENCE |
|---|---|---|---|
| 20 | 23 | 24 | 2 |
| 21 | 24 | 19 | 1 |
| 22 | 23 | 19 | 3 |
| 29 | 18 | 19 | 2 |
| 30 | 13 | 19 | 4 |
| 31 | 22 | 19 | 5 |
| 34 | 18 | 24 | 1 |

Table 22 Address Elements Example Data shows exemplary rows of the address elements table 402 (see FIG. 4), that may be each linked to row ID 186559 of Table 19 Addresses Table Example Data. For clarity of example, not all columns of the address elements table 402 are shown in Table 22 Address Elements Example Data.

TABLE 22

Address Elements Example Data

| ID | ADDR_ID | VALUE | AEV_ID | AE-TYPE | ATE_ID |
|---|---|---|---|---|---|
| 1251998 | 186559 | 3523 |  | UAE | 9 |
| 1251999 | 186559 | Cecil |  | UAE | 10 |
| 1252000 | 186559 |  | 5 | VAE | 1 |
| 1252001 | 186559 | San Jose |  | UAE | 38 |

TABLE 22-continued

Address Elements Example Data

| ID | ADDR_ID | VALUE | AEV_ID | AE-TYPE | ATE_ID |
|---|---|---|---|---|---|
| 1252002 | 186559 |  | 265 | VAE | 41 |
| 1252003 | 186559 | 95117 |  | UAE | 68 |

Each row of Table 22 may have a matching ADDR_ID to one row of Table 19 Addresses Table Example Data (i.e., each of these rows can be part of the same address). Table 23 Address Element Value Example Data shows two exemplary rows of data. In Table 22, row ID 1251998 has a value of "3523" and an address template element ID value of 9; row ID 1251999 has a value of "Cecil" and an address template element of 10; and row ID 1252000 has the address element type set to "VAE," indicating that the element has a value defined within the address element values table 404, and therefore has no user value. In row ID 1252000, address element value ID is "5," thereby linking to a value of "Ave" in Table 23 Address Element Value Example Data.

TABLE 23

Address Element Value Example Data

| ID | AET_ID | VALUE | TEXT_POSITION |
|---|---|---|---|
| 5 | 22 | Ave | A |
| 265 | 52 | CA | A |

Similarly, row ID 1252002 of Table 22 has an exemplary address element value ID of "265," thereby associating an element value of "CA."

Table 24 Address Templates Example Data shows exemplary data for the address templates table 410, and includes seven address templates. Not all columns are shown within Table 24, for clarity of example.

TABLE 24

Address Templates Example Data

| ID | CTRY_ID | NAME | DISPLAY_ORDER | DESCRIPTION |
|---|---|---|---|---|
| 1 | 2 | Standard Street Address | 1 | Standard street address. PO Box and Rural routes should not use this template. |
| 3 | 2 | Post Office Box Address | 2 | Post Office Box address only. |
| 4 | 2 | Rural Route Address | 3 | Rural Route address only. |
| 5 | 2 | Military Address | 5 | Military Address. |
| 8 | 2 | Highway Contract Route Address | 6 | Highway Contract Route/Star Route Address |
| 9 | 2 | Highways | 7 | County, State and Local highway standard address |
| 18 | 2 | Unformatted Address | 8 |  |

Table 25 Address Template Elements Example Data shows exemplary address template element data from the address template elements table 412, and is associated with row ID 1 of Table 24 Address Templates Example Data.

TABLE 25

Address Template Elements Example Data

| ID | ADDT_ID | AET_ID | OPTIONAL | USE_IN_SEARCH_STRING |
|---|---|---|---|---|
| 1 | 1 | 22 | Y | N |
| 2 | 1 | 24 | Y | N |
| 3 | 1 | 29 | Y | N |
| 4 | 1 | 30 | Y | N |
| 9 | 1 | 33 | N | Y |
| 10 | 1 | 35 | N | Y |
| 11 | 1 | 39 | Y | N |
| 38 | 1 | 36 | N | N |

TABLE 25-continued

Address Template Elements Example Data

| ID | ADDT_ID | AET_ID | OPTIONAL | USE_IN_SEARCH_STRING |
|---|---|---|---|---|
| 39 | 1 | 50 | N | N |
| 41 | 1 | 52 | N | N |
| 68 | 1 | 51 | Y | Y |
| 69 | 1 | 73 | Y | N |

Row ID 3 of Table 25 may have an AET_ID value of 29 that identifies a Post-Directional address element type, as shown in Table 26 Address Element Types Example Data.

TABLE 26

Address Element Types Example Data

| ID | NAME | FORMAT_CASE | VALID_ELEMENT |
|---|---|---|---|
| 22 | Street Type | M | Y |
| 24 | Pre-Directional | M | Y |
| 29 | Post-Directional | M | Y |
| 30 | Within Unit Designator | M | Y |
| 33 | Door Number | M | N |
| 35 | Street Name | M | N |
| 36 | Municipality | M | N |
| 39 | Within Unit Identifier | M | N |
| 50 | Country | M | N |
| 51 | Zip Code | M | N |
| 52 | State | U | Y |
| 73 | Zip + 4 | M | N |

In particular, the address template elements table 412 links an address template to its available associated address elements.

TABLE 27

Address Presentation Templates Example Data

| ID | ADDT_ID | NAME | INPUT_TEMPLATE | FONT | FONT_SIZE |
|---|---|---|---|---|---|
| 1 | 1 | Standard Street Address | Y | AR | 12 |
| 9 | 4 | Rural Route Address | Y | AR | 12 |
| 10 | 3 | Post Office Box Address | Y | AR | 12 |
| 11 | 5 | Military Address | Y | AR | 12 |
| 14 | 8 | Highway Contract Route Address | Y | AR | 12 |
| 15 | 9 | Highways | Y | AR | 12 |
| 18 | 1 | Label presentation address | N | AR | 10 |
| 22 | 18 | Unformatted Address | Y | AR | 10 |

Examplary data for the address presentation templates table 414 is shown in Table 27 Address Presentation Templates Example Data.

TABLE 28

Address Pres Template Elements Example Data

| ID | APT_ID | ATE_ID | LINE_NUMBER | LINE_POSITION_NUMBER | SEPARATOR_CHARACTER |
|---|---|---|---|---|---|
| 2 | 1 | 10 | 1 | 3 | S |
| 9 | 1 | 9 | 1 | 1 | S |
| 11 | 1 | 2 | 1 | 2 | S |
| 14 | 1 | 1 | 1 | 4 | S |
| 15 | 1 | 3 | 1 | 5 | S |
| 16 | 1 | 4 | 1 | 6 | S |
| 17 | 1 | 11 | 1 | 7 | EOL |

Table 28 Address Pres Template Elements Example Data shows examplary data within the address pres template elements table 416 for row ID 1 of Table 27 Address Presentation Templates Example Data. In particular, for each address template element, the address pres template elements table 416 may provide presentation information in the form of a line number, a line position, and a separator character, where "S" is a space and "EOL" is an end of line (CR) character.

TABLE 29

Address Element Aliases Example Data

| ID | AEV_ID | VALUE |
|---|---|---|
| 15 | 5 | AV |
| 16 | 5 | AVE |
| 17 | 5 | AVEN |
| 18 | 5 | AVENU |
| 19 | 5 | AVENUE |
| 20 | 5 | AVNUE |

Examplary data for the address element aliases table 408 is shown in Table 29 Address Element Aliases Example Data, which illustrates six alternative ways the street type of "avenue" may be entered. The address element aliases table 408 may thus be used to identify a preferred form for an address element value. In this example, column AEV_ID links to row ID "5" of the address element values table 404 shown in Table 23 Address Element Value Example Data, which Table then stores a preferred value of "Ave."

TABLE 30

System Tables Example Data

| TABLE SHORT NAME | TABLE NAME | DISPLAY NAME | TABLE EXISTS | REFERENCE CODE LOOKUP | TRANSACTION DATA |
|---|---|---|---|---|---|
| CERT | CERTIFICATES | Certificates | Y | N | Y |
| GIP | GROUP_INSURANCE_PURCHASES | Group Insurance Purchases | Y | N | Y |
| I | INSUREDS | Insureds | Y | N | Y |
| ORG | ORGANIZATIONS | Organizations | Y | N | Y |
| PEP | PEOPLE | People | Y | N | Y |

Table 30 System Tables Example Data shows five exemplary entries, one for each of entities tables "Certificates," "Group Insurance Purchases," "Insureds," "Organizations," and "People," having table short names of "CERT," "GIP" "I," "ORG," and "PEP," respectively. Tables "Certificates," "Group Insurance Purchases," "Insureds," "Organizations," and "People" may each represent one of entities tables 302 (see FIG. 3). Within Table 30 System Tables Example Data, the short table name "ORG" may identify Table 3 Organizations, and the short table name "PEP" may identify Table 4 People.

Each entities table 302 may be created to store a certain type of data. As shown above in Table 3 Organizations, an Organizations table stores information relating to organizations, whereas a People table, as shown in Table 4 People, stores information about an individual person.

Where a group insurance product is purchased by a company for its employees, an entry may be added to a group insurance purchases table (not shown). The information within this table would thus represent the insurance group, and each group application issued would result in one and only one group insurance purchase entry.

In another example of entities table 302, an "Insureds" table may identify a person that has been enrolled in an insurance plan. The only requirement for each entities table 302 in this example is that each has a unique key column named "ID." Other data with the table may then be specifically identified using the table short name and a key value for the ID. This identification permits the association of addresses with any entity identified within a plurality of entity tables.

Table 31 People Example Data show exemplary data for an entities table 302 that containing information about people. In this example, an individual called "Larry King" is identified by an ID of "835985." This table may have a name within database of PEOPLE and an associated short name of PEP. Thus, within database 102, the entity known as Larry King is identified using the short table name PEP and ID 835985.

TABLE 31

People Example Data

| ID | First Name | Last Name |
|---|---|---|
| 835985 | Larry | King |

Table 32 Organizations Example Data is an exemplary entities table 302 containing information about organizations. A first row with an ID of 888 contains information for an organization called "Smith & Associates, Attorneys at Law." This table may have a name within database 102 of "ORGANIZATIONS" and a short table name of "ORG." Thus, the entity called Smith & Associates, Attorneys at Law is identified using the short table name ORG and ID 888. A second row in the example identifies a company called HVAC Industries, Inc. and has an ID of 574255.

TABLE 32

Organizations Example Data

| ID | Name |
|---|---|
| 888 | Smith & Associates, Attorneys at Law |
| 574255 | HVAC Industries, Inc. |

Another exemplary entities table 302 is shown in Table 33 Group Insurance Purchases Example Data. However, this table provides an indirection to the organizations table shown in Table 32, for recording each insurance purchase made by an organization. In the example, one organization may purchase both a Major Medical insurance product and a Dental insurance product.

TABLE 33

Group Insurance Purchases Example Data

| ID | ORG-ID |
|---|---|
| 24768 | 574255 |

Exemplary data for address associations table 306 is shown in Table 34 Address Associations Example Data. A first entry (having ID=930353) shows an address association between another address having an ID of 15281, and an entity with an ID of 835985 in the table identified by the Short Table name of "PEP," which is Table 31 People Example Data in this example. Row ID 574892 of Table 34 associates an address with a certificate identified as ID 399 within a Certificates table having a Short Table name of CERT, which is, in this example, the certificate owned by Larry King.

Thus, when sending correspondence related to the certificate of Larry King, the address associated with the certificate may be selected for use.

TABLE 34

Address Associations Example Data

| ID | AUT_ID | OA_ID | ADDR_ID | SHORT NAME | KEY VALUE | OBS | ACTIVE START MONTH | ACTIVE DURATION | MAIL LOC |
|---|---|---|---|---|---|---|---|---|---|
| 930353 | 23 | 15281 | | PEP | 835985 | N | | | |
| 574891 | 23 | | 224547 | PEP | 835985 | N | | | |
| 574892 | 18 | | 224548 | CERT | 399 | N | | | |
| 574893 | 22 | | 11425 | ORG | 574255 | N | | | |
| 777 | 22 | | 999 | ORG | 888 | N | | | |

As described in the example above, row ID 930353 associates the other address ID 15281 with Larry King. A second row ID 574891 associates a location address ID 224547 with Larry King. Both of these associations have an associated address usage type of "General Use," which, based upon AUT-ID entries, would each be 23. Row ID 574893 may associate a location address ID 11425 with organization entity HVAC Industries, Inc.

TABLE 35

Other Address Types Example Data

| ID | NAME_1 | NAME_2 | FORMAT_DESCRIPTION | NOTES |
|---|---|---|---|---|
| 1 | E-Mail | | | Example: ithelp@alliednational.com |
| 2 | Voice Phone | phone ext. | ###-###-#### | Extension only specified in "Name 2". |
| 3 | Fax Phone | | ###-###-#### | |
| 4 | International Voice Phone | phone ext. | #-###-###-#### | Extension only specified in "Name 2". |
| 5 | Pager Phone | | | |
| 6 | URL | | www.domain_name.com | Example: www.alliednational.com |
| 7 | TCP/IP Address | | ###.###.###.### | Example: 10.1.1.21 |

Table 35 Other Address Types Example Data shows an example of seven alternate types of other (non-location) addresses that may be stored within database 102, and associated with one or more entities. Table 36 Other Address Valid Types Example Data shows associations between address usage types of Table 20, and the first three other address types of Table 35. Other address type ID 1 (E-Mail) may be used with address usage types 37, 51 and 54.

TABLE 36

Other Address Valid Types Example Data

| ID | OAT_ID | AUT_ID |
|---|---|---|
| 9 | 1 | 37 |
| 10 | 1 | 51 |
| 11 | 1 | 54 |
| 12 | 3 | 36 |
| 13 | 3 | 42 |
| 14 | 3 | 39 |
| 15 | 2 | 34 |
| 16 | 2 | 35 |
| 17 | 2 | 38 |
| 18 | 2 | 41 |
| 19 | 2 | 58 |
| 20 | 3 | 58 |
| 21 | 2 | 59 |
| 22 | 3 | 59 |

Table 37 Other Addresses Example Data shows exemplary values stored for "voice phone" type of other addresses (i.e., based upon OAT_ID: 2 and Table 35), each of which may be referenced by column "OA ID" within address associations table 306.

TABLE 37

Other Addresses Example Data

| ID | OAT_ID | ADDR_ID | ADDRESS_VALUE_1 | ADDRESS_VALUE_2 | L |
|---|---|---|---|---|---|
| 59 | 2 | | 555-354-9070 | | Y |
| 60 | 2 | | 555-646-3410 | | Y |
| 61 | 2 | | 555-559-5094 | | Y |

Table 38 Addressee Overrides shows exemplary columns for a table to facilitate overrides of a specified address for a particular entity. Continuing with the above examples, to route all mail for Larry King to a law firm, such as for estate purposes if Larry King dies, an entry is added to addressee overrides table as shown in Table 39 Addressee Overrides Example Data.

TABLE 38

Addressee Overrides

| Column Name | Column Type |
|---|---|
| ID | NUMBER(28) |
| ST_TABLE_SHORT_NAME | VARCHAR2(10) |
| KEY_VALUE | NUMBER(28) |
| NAME | VARCHAR2(100) |
| AA_ID | NUMBER(28) |
| DATE_CREATED | DATE |
| CREATED_BY | VARCHAR2(30) |
| DATE_MODIFIED | DATE |
| MODIFIED_BY | VARCHAR2(30) |

As shown, within Table 39 Addressee Overrides Example Data, an entry with an ID of 6587447 identifies Larry King as an entity within Table 31 People Example Data by using the short table name of "PEP," and a key value of 835985. This entry within Table 39 Addressee Overrides Example Data also provides an address association ID (column AA_ID) that identifies an address association within Table 34 Address Associations Example Data for the organization called "Smith and Associates, Attorneys at Law," as shown in Table 32 Organizations Example Data. Thus, by accessing the address overrides table prior to determining the address through the normal path, an address override, if found, may take precedence and a normal path may be used to determine an address if an address override is not found. An address override may override all other stored addresses for an entity; the address override does not require though, that these other addresses be removed or dissociated from the entity. Normal address utilization may occur once the address override is removed.

TABLE 39

Addressee Overrides Example Data

| ID | ST_TABLE_SHORT NAME | KEY_VALUE | NAME | AA_ID |
|---|---|---|---|---|
| 6587447 | PEP | 835985 | The estate of Larry King | 777 |

Figure 11:
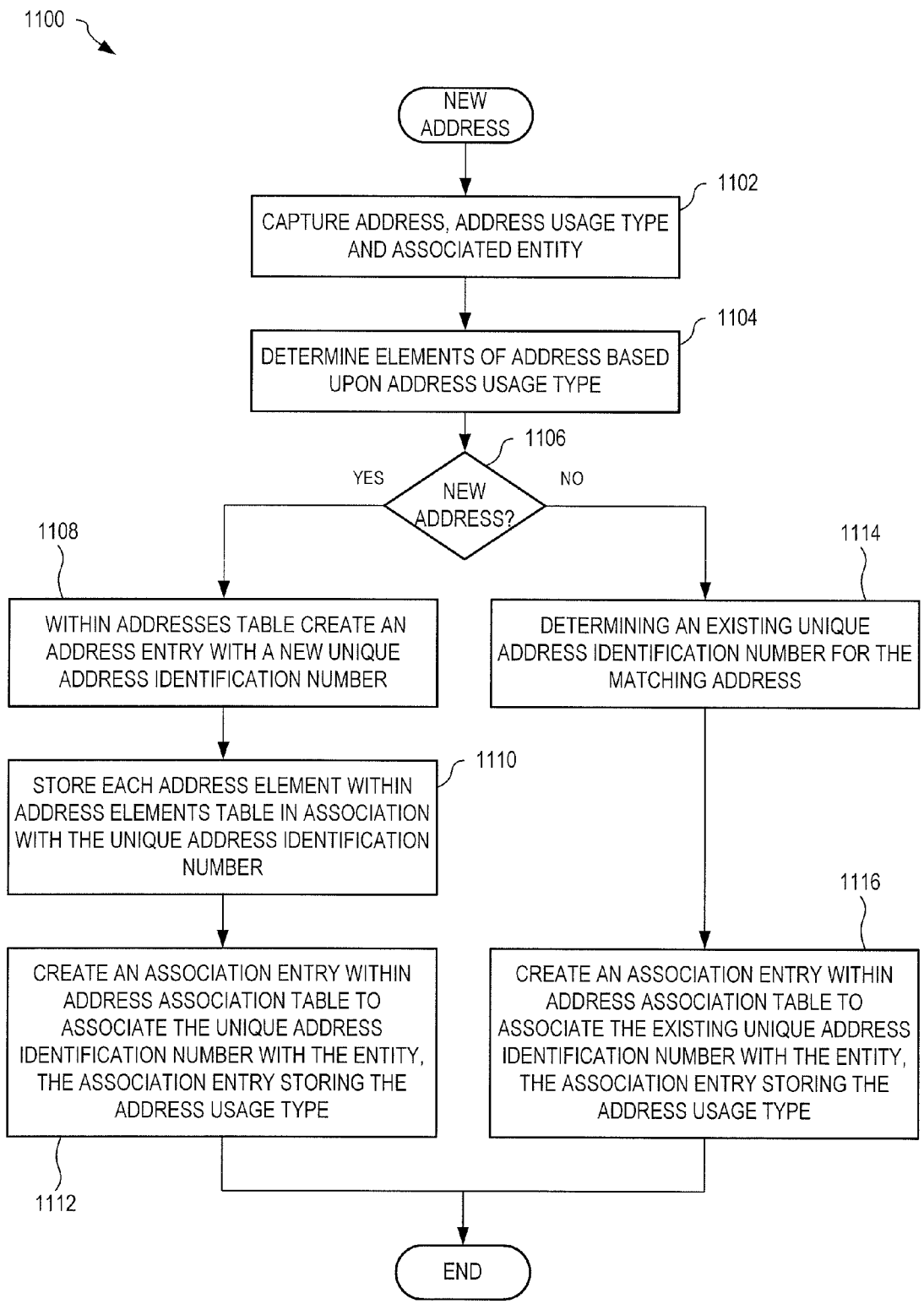
FIG. 11 is a flowchart illustrating one exemplary method for capturing and storing an address within the database of the system of FIG. 1.

FIG. 11 shows one exemplary method 1100 for capturing and storing an address within database 102 (FIG. 1). Method 1100 may be implemented by one or more procedures within database 102.

In step 1102, method 1100 captures an address, an address usage type, and an associated entity. In one example of step 1102, a user interacts with database 102 via form 600 (see FIG. 6). In step 1104, method 1100 may determine elements of the address based upon the selected address usage type of step 1102. In one example of step 1104, elements of the address captured in step 1102 may be determined using an address template that is selected based upon the address usage type.

Step 1106 is a decision step. If, in step 1106, method 1100 determines that the address is already stored within the database, method 1100 continues to step 1114; otherwise method 1100 continues to step 1108. In one example of step 1106, at least part of the one or more elements determined in step 1104 are formed into a search pattern that is used to search for matching addresses already stored within database 102. For example, by using the same method of forming the search pattern as is used to form the search strings stored within addresses table 308, FIG. 3, addresses table 308 may be searched to determine whether the captured address may already be stored within database 102. In one embodiment, where a match is found, method 1100 displays the found address against the captured address and asks the user to verify that they are the same.

In step 1108, method 1100 creates a new address entry with a unique address identification number within an addresses table. In one example of step 1108, the create new address procedure 1002 (see FIG. 10), adds a row to addresses table 308, which then creates a new unique value for column ID of the row that is used to identify the new address. In step 1110, method 1100 stores each address element within an address elements table in association with the unique address identification number. In one example of step 1110, address elements determined in step 1104 are stored in the address elements table 402 (see FIG. 4), and each stored element may include the unique address identification and an address element type. Additionally, the address elements table 402 may include an address template element reference that identifies where a particular element value is used within an address template.

In step 1112, method 1100 creates an association entry within an address association table that stores the unique address identification number, identification of the entity to which it belongs, and the address usage type for the address. In one example of step 1112, a new row is added to the address associations table 306, in which may be stored the ID value of the row added in step 1108 (thereby identifying the new address), the short table name "ORG" for the organizations table, and an organizations table ID of 574255, as shown in Table 32 Organizations Example Data. Method 1100 then ends.

In step 1114, method 1100 determines an existing unique address identification number for the address matched in step 1106. In one example of step 1114, the search performed in step 1106 identifies a row within the addresses table 308, which then may be used to retrieve an existing unique address identification number (i.e., the row ID) for the matched address. In step 1116, method 1100 creates an association entry within the address associations table to associate the existing unique address identification number with the entity and stores the address usage type within the associated row. In one example of step 1116, a new row is added to address associations table 306, in which row is stored the existing unique address identification number from step 1114, and the address usage type of step 1102.

Changes may be made in the above methods and systems without departing from the scope hereof. It should be noted that the matter contained in the above description, or shown in the accompanying drawings, should be interpreted as illustrative, and not in a limiting sense. The following claims are intended to cover generic and specific features described herein, as well as all statements made above regarding the scope of the present method and system, which, as a matter of language, might be said to fall therebetween.

What is claimed is:

1. A computer-implemented method for storing addresses within a database, comprising:
    capturing, to a memory of the computer, an address for an entity, the address having an address usage type that defines the intended use of the address;
    determining, by a processor of the computer, address elements of the address using an address template based upon the address usage type;
    determining whether the address is already stored within the database;
    if the address is not already stored within the database:
        creating, by the processor, within an addresses table, the database, and an address entry having a new unique address identification number;
        storing each of the address elements within an address element table of the database in association with the new unique address identification number; and
        creating, by the processor, an association entry within an address association table to associate the new unique address identification number with the entity and to store the address usage type;
    if the address is already stored within the database:
        determining an existing unique address identification number for the address within the database; and
        creating, by the processor, an association entry within the address association table to associate the existing unique address identification number with an entity and to store the address usage type;
    wherein the address usage type corresponds to an entry in an address usage order table that defines an order for searching for an alternative address when there is no address stored within the database with a requested address usage type for an entity.

2. The method of claim 1, the step of creating, within the addresses table, the address entry comprising:
    forming a search string from at least part of one or more of the address elements; and
    storing the search string within the address entry.

3. The method of claim 2, the step of determining whether the address is already stored within the database comprising:
    forming a search pattern from at least part of the determined address elements; and
    searching for the search pattern within the search string stored within the addresses table.

4. The method of claim 1, the step of storing each of the address elements comprising storing an element type with each of the stored address elements.

5. The method of claim 1, the steps of creating an association entry comprising storing, within the association entry, a short table name and a unique entity identifier of the entity within an entity table identified by the short table name.

6. The method of claim 5, further comprising a step of storing, within a system table, the short table name and a database table name of the entity table, the system table facilitating retrieval of the entity table based upon the short table name.

7. The method of claim 1, the step of capturing comprising capturing the address interactively from a user by providing an on screen form for completion by the user.

8. The method of claim 1, the steps of creating an association further comprising utilizing an indirection table between the address association table and one of a plurality of entity tables storing the one or more entities.

9. The method of claim 1, wherein the entity is one of a person, an organization, a certificate, a group insurance policy, and an insured.

10. A software product comprising instructions, stored on a computer-readable non-transitory medium, wherein the instructions, when executed by a computer, perform steps for storing postal addresses within a database, comprising:
    instructions for capturing an address;
    instructions for identifying address elements within the captured address based upon one of a plurality of address templates;
    instructions for storing the address elements within a plurality of tables of a database; and
    instructions for associating the captured address with an address usage type and one or more entities via an address associations table;
    wherein the address usage type corresponds to an entry in an address usage order table that defines an order for searching for an alternative address when there is no address stored within the database with a requested address usage type for an entity.

11. A computer-implemented method for storing addresses within a database, comprising:
    capturing, by the computer, an address comprising a plurality of address elements that are identified using one of a plurality of address templates;
    storing the address elements within a plurality of tables of a database stored within a memory of the computer; and
    associating, by the computer, the address elements with an address usage type and an entity via an address associations table;
    wherein the address usage type corresponds to an entry in an address usage order table that defines an order for searching for an alternative address when there is no address stored within the database for a requested address usage type.

12. The computer-implemented method of claim 11, further comprising storing, within an addressee overrides table, an address association ID in association with an entity that identifies an override address within the associations table that is retrieved from the database instead of all other addresses for that entity.

* * * * *